(12) United States Patent
Bardy et al.

(10) Patent No.: US 11,065,826 B2
(45) Date of Patent: Jul. 20, 2021

(54) METHOD FOR MANUFACTURING A PART MADE OF COMPOSITE MATERIAL

(71) Applicant: SKF Aerospace France S.A.S, Montigny-le-Bretonneux (FR)

(72) Inventors: Florian Bardy, Lons-Le-Saunier (FR); Eric Deneux, Metz (FR); Nicolas Lebosse, Buvilly (FR)

(73) Assignee: SKF Aerospace France S.A.S

( * ) Notice: Subject to any disclaimer, the term of this patent is extended or adjusted under 35 U.S.C. 154(b) by 0 days.

(21) Appl. No.: 16/750,506

(22) Filed: Jan. 23, 2020

(65) Prior Publication Data

US 2020/0262159 A1  Aug. 20, 2020

(30) Foreign Application Priority Data

Feb. 14, 2019  (FR) ...................................... 1901491

(51) Int. Cl.
 *B29C 70/32* (2006.01)
 *B29C 70/54* (2006.01)

(52) U.S. Cl.
 CPC ............ *B29C 70/32* (2013.01); *B29C 70/545* (2013.01)

(58) Field of Classification Search
 CPC ...... B29C 70/32; B29C 70/545; B29C 69/002
 See application file for complete search history.

(56) References Cited

U.S. PATENT DOCUMENTS 3,784,428 A * 1/1974 Willats .................. B29C 53/582
156/174

FOREIGN PATENT DOCUMENTS

| EP | 0276169 A2 * | 7/1988 | ........... B29C 53/566 |
| EP | 0276169 A2 | 7/1988 | |
| FR | 2962935 A1 | 1/2012 | |

* cited by examiner

*Primary Examiner* — Vishal I Patel
(74) *Attorney, Agent, or Firm* — Garcia-Zamor Intellectual Property Law; Ruy Garcia-Zamor; Bryan Peckjian

(57) ABSTRACT

A method for manufacturing a part made of composite material. The method is performed by a system providing a mandrel around which a composite material is wound, and a reel around which a strip of the composite material comes to be wound.

3 Claims, 3 Drawing Sheets

METHOD FOR MANUFACTURING A PART MADE OF COMPOSITE MATERIAL

CROSS-REFERENCE TO RELATED APPLICATIONS

This application claims priority to French Patent Application no. 1901491, filed Feb. 14, 2019, the contents of which are fully incorporated herein by reference.

TECHNICAL FIELD OF THE INVENTION

The present invention deals with the field of parts made of composite materials, and more particularly to the method for manufacturing same. The present application is particularly applicable in the field of the manufacturing of connecting rods for the aeronautical field, and for any part made of composite material for industrial applications.

BACKGROUND OF THE INVENTION

Conventionally, the composite materials comprise a matrix, thermoplastic or thermosetting, in which reinforcing fibres are embedded. The matrix generally consists of a resin of specific strength much lower than those of the fibres. The parts manufactured with such composite materials are designed in such a way that the transmission of the loads favours the strict pulling or compressing of the fibres in order not to strain the resin. The composite material is thus composed of layers of fibres oriented in the direction of the loads, or at the least in directions close thereto.

The parts made of composite materials are these days found in many applications replacing conventional parts made of metal by virtue of their particularly advantageous properties. Their fibrous structure allows them to be subjected to significant pulling and/or compression loads with reduced weight.

In this context, the manufacturing of parts of composite materials necessitates production, storage and handling methods that are reliable, rapid and automated in order to cope with an ever-increasing volume.

Such methods comprise, as is known, a preliminary step of manufacturing of a composite material in the form of sheets which is wound around a cylindrical mandrel. In the case where the composite material comprises a matrix of pre-impregnated resin, a separator film is attached to one face of the composite material before it is wound onto the mandrel. The methods then comprise a step in which the composite material is unwound from the mandrel then cut in a form of the desired part. These steps are generally performed in different manufacturing locations, involving storage, logistics, bulk and transportation constraints.

Furthermore, each part cannot be cut directly on the mandrel. The composite material must be unwound then cut on a support with dedicated equipment. Handling proves complex because of the large dimensions of the mandrels and of the sheets of composite material. These parts must then be stored, which, given the production volumes, can represent a significant storage area in dedicated buildings.

Another problem which arises is the removal of the separator film once the part has been cut in the composite material. This step is particularly slow and demanding, particularly at ambient temperature.

The methods currently known involve much handling of the composite material, of the mandrel, of the parts, by operators on production lines. It is desirable to automate these steps for time, efficiency and cost savings.

SUMMARY OF THE INVENTION

The present invention aims to remedy these abovementioned drawbacks.

More particularly, the present invention aims to provide a method for manufacturing a part made of composite material that is greatly automated, simple to implement with relatively commonplace and inexpensive equipment.

The invention relates to a method for manufacturing a part made of composite material comprising the following steps:

a composite material in sheet form is wound around a cylindrical mandrel so as to form at least one layer of material;

the composite material is cut directly on the mandrel in the form of a strip that is continuous and of defined width;

a free end of the strip of composite material is mounted on a reel of smaller dimensions compared to the cylindrical mandrel and that has a cylindrical support surface of a width suited to the strip, the strip of composite material being then wound around the support surface of the reel; and in a final step, the strip of composite material is unwound from the reel, then cut to form a part of defined dimensions.

By virtue of the invention, all of the operations can be performed in an automated manner, with a minimum of handling by operators on the production lines.

Indeed, the winding of the composite material in sheet form onto the mandrel can easily be automated in the output stage of the manufacturing of the composite material, by ensuring a controlled rotation of the mandrel. The cutting in strip form of the composite material is performed directly on the mandrel, without having to remove the material from the mandrel.

Then, the mandrel and the reel can be automatically rotated with synchronized movements in order to ensure the unwinding of the strip of composite material from the mandrel to the reel.

Finally, the final cutting of a part from the strip can be automated by a rotation of the reel for the unwinding of the strip, the latter then being cut by an industrial cutting machine.

Another advantage of the method according to the invention is that it requires equipment that is commonplace, simple to handle, transport and store. In particular, the composite material in strip form wound on a reel is particularly practical for automated implementation, as mentioned previously, and simplified maintenance.

Moreover, it is no longer necessary to ensure the storage of parts made of composite material that have been cut, only of the reels. The final cutting of a part can thus be performed just before the part is put in place in its final application. The reels are of smaller dimensions and can more easily be stored than a mandrel. Furthermore, one and the same reel can store a plurality of parts in strip form before the final cutting thereof.

Finally, the method according to the invention is modular and can be adapted to all forms and dimensions of parts made of composite material.

According to other advantageous but non-mandatory features of the invention, such a method can also include the following features, taken alone or in any technically admissible combination:

The step (b) consists in a cutting of the composite material directly on the mandrel by a cutter whose cutting axis is substantially inclined relative to the edge of the wound composite material, the cutter being able to be displaced axially, the mandrel being rotated in synchronism with the axial displacement of the cutter so as to ensure a helical cutting of the composite material and thus form a strip that is continuous and of defined width.

The composite material is previously provided with a separator film on one of its faces, and wound onto the mandrel in the step (a) with the film.

The separator film is removed in parallel with the step (c).

In the step (c), a free end of the strip of composite material is mounted on a first reel and a free end of the separator film is separated from the strip of composite material and mounted on a second reel, the strip of composite material and the separator film being then wound simultaneously around their respective reels.

BRIEF DESCRIPTION OF THE FIGURES

The invention will be better understood on reading the following description which is given purely by way of nonlimiting example.

The description is given with reference to the attached drawings in which.

DETAILED DESCRIPTION OF THE INVENTION

Figure 1:
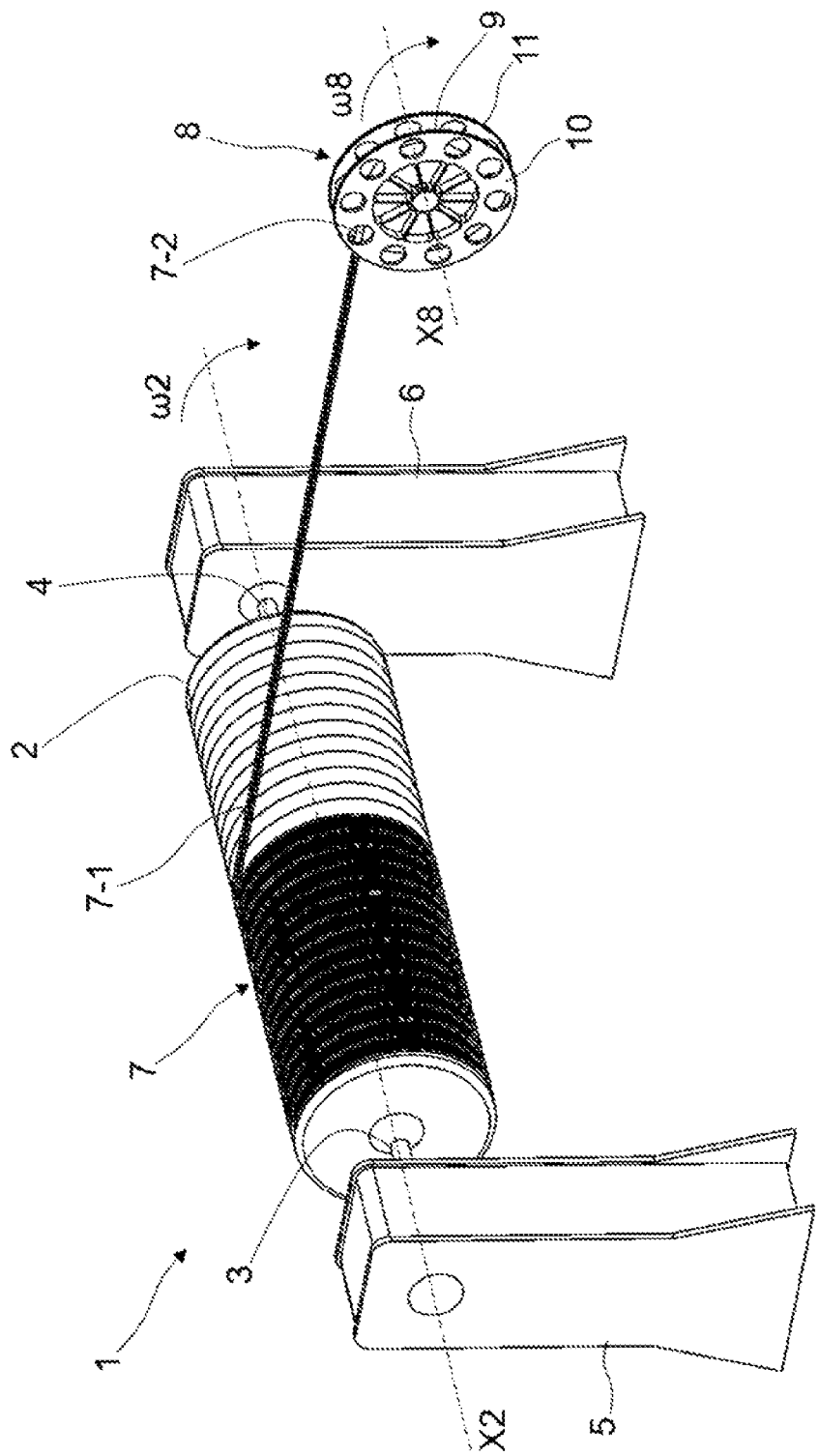
FIG. 1 is a general view of the equipment for implementing a method for manufacturing a part made of composite material according to an embodiment of the invention.

FIG. 1 shows a view of a system, referenced 1 as a whole, for the implementation of a method for manufacturing parts made of composite material.

The system comprises a mandrel 2 of cylindrical outer surface, and has an axis of rotation X2. The mandrel 2 is provided with two end axes 3, 4 mounted to rotate in supports 5, 6, respectively to ensure ground support.

Advantageously, the mandrel 2 can be separated from the supports 5, 6 and/or the supports 5, 6 are mobile.

The mandrel 2 can be set in rotational motion $\omega 2$ about the axis X2 by a controlled actuator (not represented).

In an exemplary embodiment, the mandrel 2 has a length of 2 metres for a diameter of 1 metre.

A composite material referenced 7 is wound around the cylindrical outer surface of the mandrel 2. The composite material 7 comprises a matrix, thermoplastic or thermosetting, in which reinforcing fibres are embedded. The composite material 7 is first in the form of a sheet wound around the mandrel 2 and formed by at least one layer, even a plurality of superposed layers.

The system 1 also comprises a reel 8 positioned preferentially radially and at a certain spacing from the mandrel 2.

The reel 8 comprises a cylindrical outer surface 9, and has an axis of rotation X8. Advantageously, the axes of rotation X8 and X2 are parallel to one another.

The reel also comprises two centring flanges 10, 11 situated axially on either side of the cylindrical support surface 9.

The reel can be set in rotational motion $\omega 8$ about the axis X8 by a controlled actuator (not represented).

The reel has smaller dimensions compared to the mandrel 2. In an exemplary embodiment, the cylindrical support surface 9 has a diameter of 300 millimetres.

According to the invention, the method for manufacturing a part made of composite material comprises the steps below.

The composite material 7, wound around the cylindrical mandrel 2, is cut directly on the mandrel in the form of a strip 7-1.

Preferentially, the cutting of the composite material 7 is done by a cutter (not represented) whose cutting axis is substantially inclined relative to the edge of the wound composite material 7. The cutter is placed at an end of the composite material 7, so as to pass through all of the layers wound on the mandrel 2. The cutter is displaced axially, the mandrel being rotated $\omega 2$ in synchronism with the axial displacement of the cutter so as to ensure a helical cutting of the composite material 7, and thus form the strip 7-1 that is continuous and of defined width.

Particularly advantageously, the width of the strip 7-1 of composite material 7, or cutting pitch, corresponds to the width of the part to be manufactured. Preferentially, the cylindrical support surface 9 of the reel 8 is of a width suited to this cutting pitch.

Thereafter in the method, a free end 7-2 of the strip 7-1 of composite material 7 is mounted on the cylindrical outer surface 9 of the reel 8.

The reel 8 and the mandrel 2 are each rotated $\omega 8$, $\omega 2$ about their respective axes X8, X2. The speeds of the rotations $\omega 8$, $\omega 2$ are synchronized by a controlled actuator. The strip 7-1 of composite material 7 is thus wound around the cylindrical support surface 9 of the reel 8, the strip 7-1 being guided by the flanges 10, 11.

Once the available radial space around the support surface 9 of the reel 8 is filled, the strip 7-1 is cut. The reel 8 is then stored, and a new reel (similar or not) is put in place. This operation is repeated as many times as necessary.

Once the composite material 7 has been entirely unwound onto one or more reels 8, the mandrel 2 is replaced by a new one provided with composite material 7, the preceding steps being repeated. The reels 8 are, for their part, stored and possibly transported to a place of final manufacture of the composite part.

Finally, in a final step, the strip 7-1 of composite material 7 is unwound from the reel 8 onto a support, then cut to form a part. In this step, the part made of composite material of defined dimensions and form is manufactured from the strip 7-1.

Figure 2:
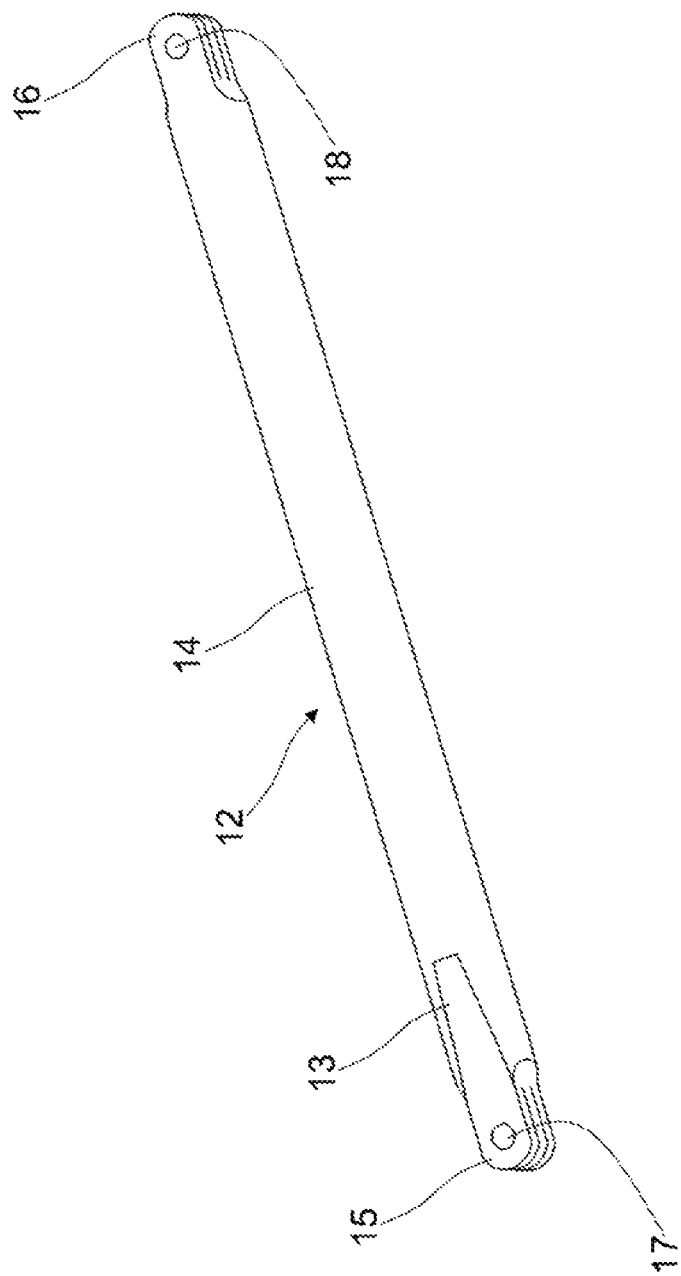
FIG. 2 is a perspective view of a connecting rod made of composite material equipped with a connecting part manufactured by the method with the equipment of FIG. 1.

As an example, FIG. 2 illustrates a connecting rod 12 made of composite material provided with a reinforcing piece 13 manufactured by the method according to the steps previously described.

The connecting rod 12 comprises a body 14 formed in a single piece. The body 14 is tubular and is lengthened at its ends by straps 15, 16. These straps 15, 16 are each provided with an opening 17, 18, respectively.

The connecting rod 12 is particularly applicable in the aeronautical field.

One end 15 of the connecting rod 12 is reinforced on each side by a reinforcing piece 13 of length L13, of width 113, and of predefined form.

The reinforcing piece 13 is formed from a composite material 7. A strip 7-1 of width 113 is cut directly on the mandrel 2, the strip being then wound onto a reel 8. In a final step, the strip 7-1 is cut successively over a length L13 in order to form portions that are then cut to the desired form for the part 13. Alternatively, the strip 7-1 is directly cut successively to the desired form for the part 13 with a hollow-punch-type tool. The part 13 is subsequently secured to the end 15 of the connecting rod 12.

The part 13 is only an embodiment provided by way of nonlimiting example. The manufacturing method according to the invention is applicable to all types of parts, of appropriate forms, dimensions and applications.

Figure 3:
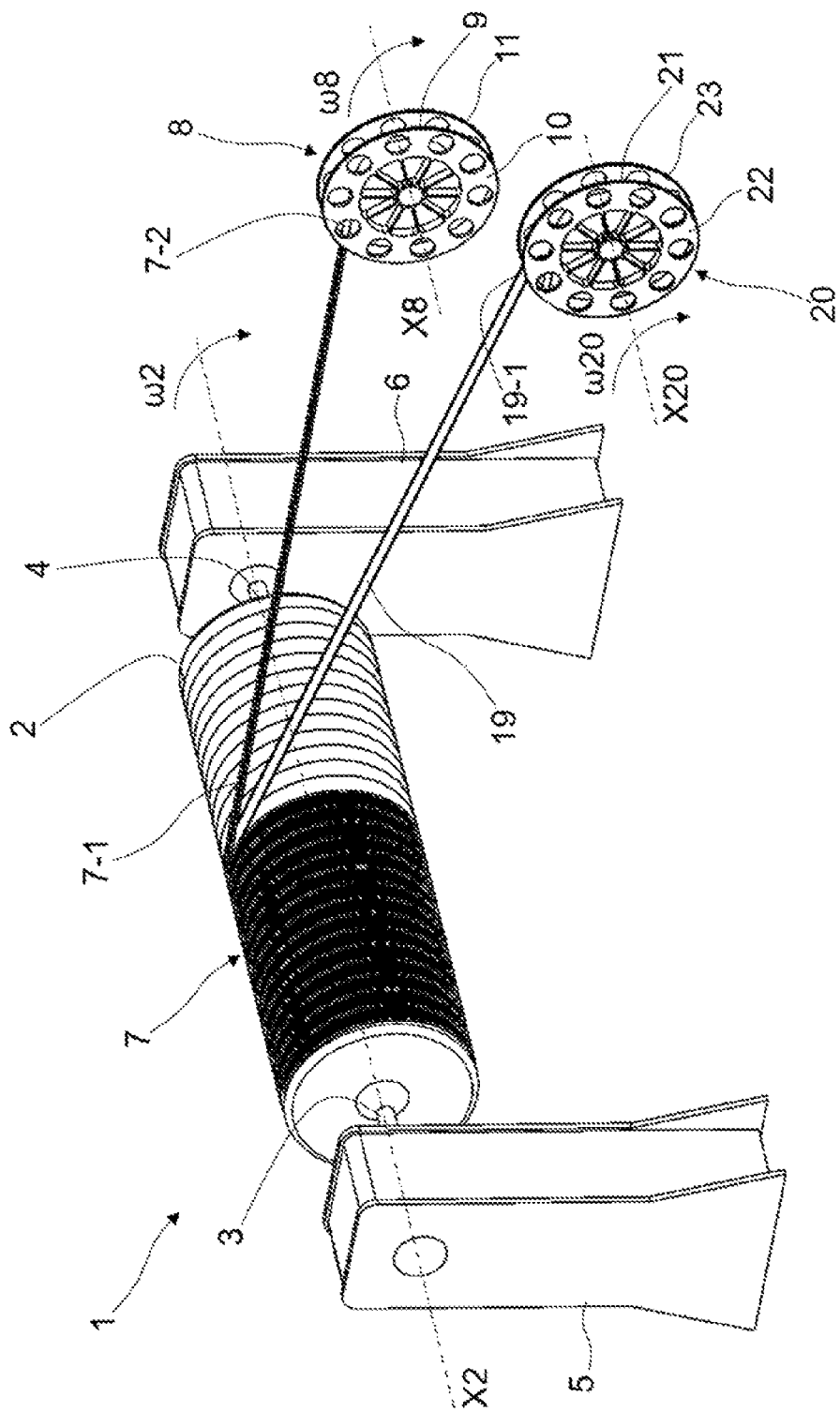
FIG. 3 is a general view of the equipment for implementing a method for manufacturing a part made of composite material according to another embodiment of the invention.

According to an embodiment illustrated in FIG. 3 and that is particularly advantageous of the present invention, the composite material 7 comprises a separator film 19 attached to a bottom face of the composite material 7 before it is wound onto the mandrel 2.

The system 1 also comprises a second reel 20, similar or not to the first reel 8.

The reel 20 comprises a cylindrical support surface 21, and has an axis of rotation X20. Advantageously, the axes of rotation X20, X8 and X2 are parallel to one another.

The reel 20 also comprises two centring flanges 22, 23 situated axially on either side of the cylindrical support surface 21.

The reel 20 can be set in rotational motion ω20 about the axis X20 by a controlled actuator (not represented).

The manufacturing method according to this manufacturing mode also comprises the step of mounting a free end 7-2 of the strip 7-1 of composite material 7 on the first reel 8, of separating a free end 19-1 of the separator film 19 from the strip 7-1, and of mounting this end 19-1 on the second reel 20. The strip 7-1 of composite material 7 and the separator film 19 are then wound simultaneously around their respective reels 8, 20.

The speeds of the rotations ω20, ω8, ω2 are synchronized by a controlled actuator. The strip 7-1 of composite material 7 is thus wound around the cylindrical support surface 9 of the first reel 8, the strip 7-1 being guided by the flanges 10, 11, while, simultaneously and in parallel, the separator film 19 is removed from the strip 7-1 by being wound around the cylindrical support surface 21 of the second reel 20.

In addition, the technical features of the different embodiments can be, wholly or just for some of them, combined with one another. Thus, the pulley device can be adapted in terms of costs, performance and simplicity of implementation.

The invention claimed is:

1. A method for manufacturing a part made of composite material comprising the following steps:
   (a) providing a composite material in strip or sheet form with a separator film on one of its faces wound around a cylindrical mandrel so as to form at least one layer of material;
   (b) cutting directly the composite material on the mandrel in the form of a strip that is continuous and of defined width;
   (c) mounting a free end of the strip of composite material on a reel of smaller dimensions compared to the cylindrical mandrel and that has a cylindrical support surface of a width suited to the strip, the strip of composite material being then wound around the support surface of the reel, the separator film being removed from the strip of composite material as the strip of composite material is wound around the support surface of the reel; and
   (d) unwinding the strip of composite material from the reel and then being cut to form a part of defined dimensions.

2. The method according to claim 1, further comprising step (b) consists in cutting of the composite material directly on the mandrel by a cutter whose cutting axis is substantially inclined relative to the edge of the wound composite material, the cutter being able to be displaced axially, the mandrel being rotated synchronously with the axial displacement of the cutter so as to ensure a helical cutting of the composite material and thus form a strip that is continuous and of defined width.

3. The method according to claim 1, further comprising, in the step (c), a free end of the strip of composite material is mounted on a first reel and a free end of the separator film is separated from the strip of composite material and mounted on a second reel, the strip of composite material and the separator film being then wound simultaneously around their respective reels.

* * * * *